United States Patent [19]
Gruener et al.

[11] Patent Number: 5,497,157
[45] Date of Patent: Mar. 5, 1996

[54] METHOD OF MONITORING AN AREA, AND A DEVICE FOR CARRYING OUT THE METHOD

[75] Inventors: Wilhelm Gruener; Tiang-Gwan Liem, both of Ulm, Germany

[73] Assignee: Deutsche Aerospace AG, Munich, Germany

[21] Appl. No.: 290,966

[22] PCT Filed: Dec. 1, 1993

[86] PCT No.: PCT/EP93/03366

§ 371 Date: Aug. 22, 1994

§ 102(e) Date: Aug. 22, 1994

[87] PCT Pub. No.: WO94/15226

PCT Pub. Date: Jul. 7, 1994

[30] Foreign Application Priority Data

Dec. 23, 1992 [DE] Germany .......................... 42 43 669.9

[51] Int. Cl.⁶ ............................ G01S 13/91; G01S 13/93
[52] U.S. Cl. .............................................. 342/36; 342/29
[58] Field of Search ................................. 342/36, 29, 30, 342/32, 37, 39, 40

[56] References Cited

U.S. PATENT DOCUMENTS

| | | | |
|---|---|---|---|
| 3,572,619 | 3/1971 | Brown .................................. 244/114 R |
| 3,872,474 | 3/1975 | Levine .................................... 342/36 |
| 3,971,025 | 7/1976 | Levine ................................... 342/410 |
| 4,060,805 | 11/1977 | McComas ............................... 342/38 |
| 4,122,522 | 10/1978 | Smith ..................................... 364/427 |
| 4,481,516 | 11/1984 | Michelotti ............................. 340/933 |
| 4,823,272 | 4/1989 | Inselberg ............................... 364/461 |
| 4,845,629 | 7/1989 | Murga .................................... 364/439 |
| 5,218,360 | 6/1993 | Goetz et al. ........................... 342/407 |
| 5,243,340 | 9/1993 | Norman et al. ....................... 340/953 |
| 5,288,163 | 2/1994 | Munson .................................. 404/9 |
| 5,321,615 | 6/1994 | Frisbie et al. ........................ 364/424.02 |
| 5,351,077 | 9/1994 | Lee et al. ............................. 342/35 X |
| 5,375,058 | 12/1994 | Bass ..................................... 364/439 |

FOREIGN PATENT DOCUMENTS 0322005 6/1989 European Pat. Off. .

OTHER PUBLICATIONS

L. Q. Bui et al: "94 Ghz FMCW Radar For Low Visibility Aircraft Landing System". IEEE MTT-S International Microwave Digest Symposium, vol. III, Jun. 10, 1991, Boston, USA, pp. 1147–1150.

W. Hopp: "Radar–und Radiometer–Sensoren im Millimeter–wellen–Bereich". NTZ Archiv, vol. 11, No. 4, Jul. 1989, Berlin, Germany, pp. 165–174.

Primary Examiner—John B. Sotomayor
Attorney, Agent, or Firm—Spencer & Frank

[57] ABSTRACT

Monitoring an area with the aid of a frequency-modulated continuous-wave radar includes emitting a frequency-modulated continuous-wave transmitting signal with at least one transmitting antenna having a directional pattern whose main azimuthal direction depends on the frequency of the transmitting signal. Related to a predeterminable direction, an azimuthal region is selected, and in the selected region, an azimuthal swivelling of the directional pattern of the transmitting antenna is carried out by changing the frequency of the transmitting signal. Also in the selected region, each azimuthal value is assigned a frequency value of the transmitting signal. The selected region is divided into a predeterminable number of azimuthal increments adjoining one another, and in each of the increments, a monotonous change of the frequency of the transmitting signal occurs. A reflected portion of the transmitting signal, which is reflected by the area to be monitored, is received with a receiving antenna, and a coherent signal processing for evaluating the receiving signal for each increment coherent signal processing is carried out.

19 Claims, 7 Drawing Sheets

METHOD OF MONITORING AN AREA, AND A DEVICE FOR CARRYING OUT THE METHOD

BACKGROUND OF THE INVENTION

1. Field of the Invention

The invention relates to a method of monitoring an area with the aid of a frequency-modulated continuous-wave radar, and to a device for carrying out the method.

2. Background Information

The invention is especially suited for aircraft, e.g., airplanes, as onboard radar so that these can also land safely under unfavorable visibility conditions, i.e. low visibility aircraft landing, e.g., fog. Furthermore, under unfavorable visibility conditions during taxiing, a monitoring of the taxiway located ahead of an aircraft is also possible.

Such an onboard radar requires a small range, e.g., less than 5 km, and a relatively good resolution [sic], e.g., 1 m to 3 m in range direction or 0.1° to 0.5° in azimuth direction. For such applications, the use of a so-called pulse radar is known. This pulse radar has the following disadvantages, inter alia:

- the small so-called duty cycle (pulse duty factor), which is due to the required high ratio of range to range resolution, requires the use of a tube transmitter, e.g., a magnetron. This tube transmitter has drawbacks known per se, e.g., a short working life and a high maintenance expenditure (because of the high voltage to be produced);
- the required high (transmitting) peak power in connection with a high (transmitting) antenna gain may lead to injuries to health, especially to the eyes. Such a pulse radar is therefore unsuitable, especially for monitoring the taxiways and/or the apron of an airport;
- the use of a pulse radar in a so-called high-PRF or pulse compression mode is, in a disadvantageous manner, very cost-intensive and therefore uneconomical;
- if several pulse radars are needed in an aircraft, disturbances occur among these in an unfavorable manner. These can only be avoided through cost-ineffective expenditure with regard to the EMC (electromagnetic compatibility).

SUMMARY OF THE INVENTION

It is therefore the object of the invention to propose a method of the generic type with which a monitoring of traffic routes on the ground, in particular landing runways and/or taxiways, becomes possible in a cost-effective and reliable manner. Furthermore, it is an object of the invention to propose a device for carrying out the method.

A first advantage of the invention is the fact that a frequency-modulated continuous-wave radar is used, which, in the following, is also referred to as FM-CW radar. Such a FM-CW radar only needs a low voltage for producing the transmitting power, e.g., 12 volts, so that economical and reliable electronic components, e.g., semiconductor circuits, can be used.

A second advantage is that for both the transmitting antenna and the receiving antenna, which may also both consist of a plurality of individual antennas, frequency-controlled antennas are used. In these, the main direction of the directional patterns depends on the frequency of the transmitting or receiving signal so that, advantageously, a mechanical swivelling and/or a generally expensive phase adjustment network for beam swivelling is not required.

A third advantage is that a very fast switch-over to different operating modes becomes possible, e.g., different ranges and/or different azimuthal scanning ranges.

Additional advantages emerge from the following description.

BRIEF DESCRIPTION OF THE DRAWINGS

In the following, the invention is described in greater detail on the basis of embodiments with reference to schematically illustrated drawings.

DETAILED DESCRIPTION OF THE PREFERRED EMBODIMENT(S)

The examples described in the following relate to an onboard radar, i.e., a transportable radar equipment, which can be used particularly advantageously in an aircraft as a landing and/or taxiing aid. Such an onboard radar configured as FM-CW radar is disposed, e.g., in the aircraft nose with the transmitting and receiving antennas being mechanically connected to the aircraft in such a manner that the changes of the plane of the aircraft can be compensated for. The azimuthal swivelling range of the main directions of the associated directional patterns essentially lies in the plane of the aircraft which is determined by the longitudinal axis of the aircraft and the axis extending through the wings (pitch axis). It is expedient to tilt the swivelling range in relation to the plane of the aircraft in such a way that, especially during the landing approach, monitoring of the ground and/or the landing runway becomes possible.

Such a FM-CW radar works, e.g., in the 35 GHz range, e.g., in a frequency range of 32 GHz to 37 GHz. From the transmitting antenna a maximum output power of approximately 0.5 W is emitted. The frequency-controlled transmitting antenna, which, e.g., has a length (in the plane of the aircraft, perpendicular to the longitudinal axis) of approximately 1.2 m and a height (perpendicular thereto) of approximately 0.15 m, has, e.g., an antenna gain of approximately 42 dB and a polarization that is dependent on the operating conditions, e.g., perpendicularly and/or parallel to the plane of the aircraft or a circular polarization. The lobe width in the direction of elevation is approximately 4°. With such a FM-CW radar a region of approximately ±15° in relation to the longitudinal axis of the aircraft can be scanned azimuthally. This region can be scanned in the azimuth with a scanning rate of approximately 30 Hz at an azimuthal angular resolution of smaller 0.3°. Here, a resolution of approximately 3 m in range direction exists at a range of approximately 6 km. With a mechanically swivelled antenna such values can only be achieved at best with an economically unjustifiable expenditure.

Figure 1:
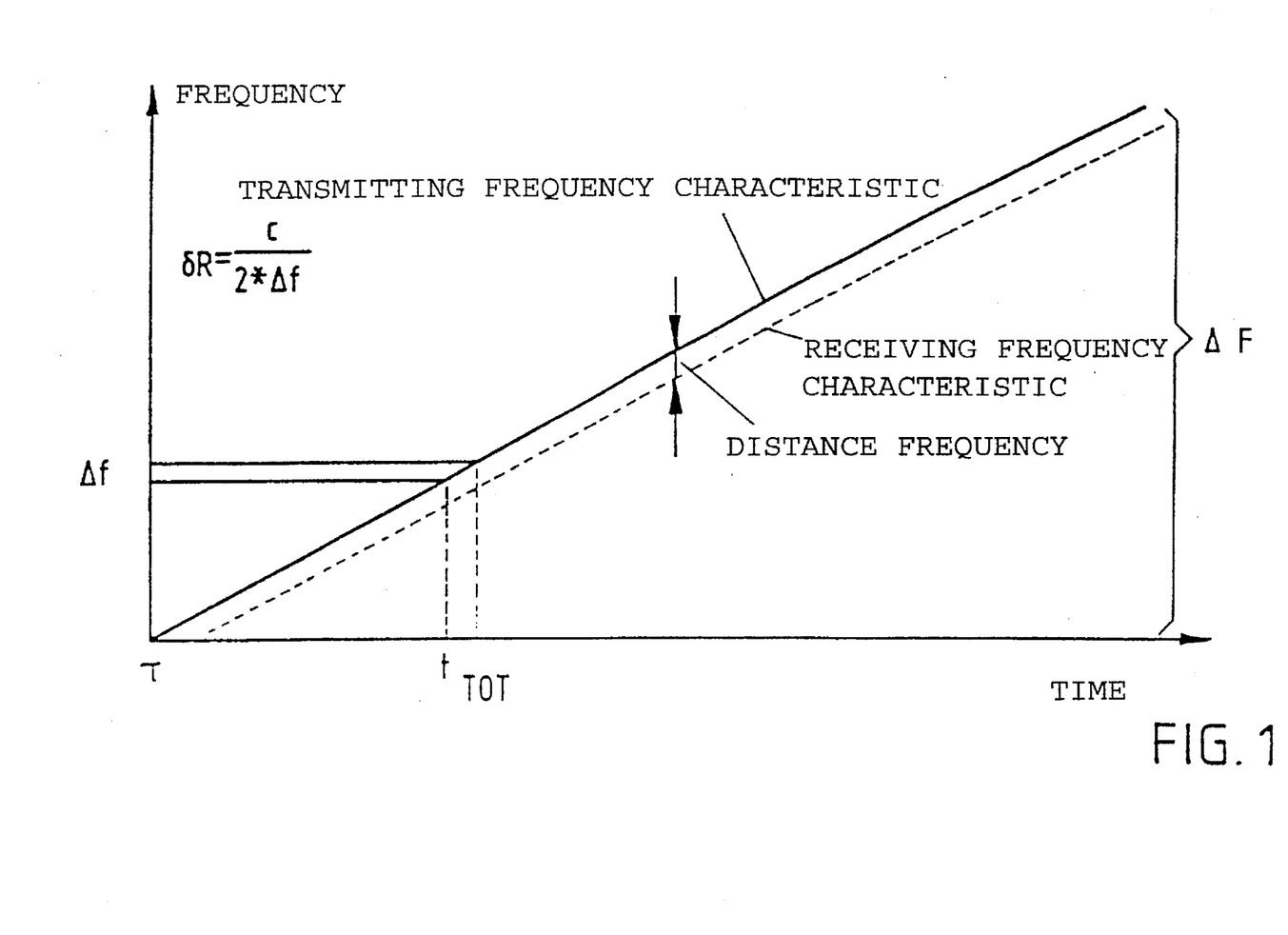
FIG. 1 is a frequency/time plot showing a time-dependent transmitting frequency characteristic and the receiving frequency characteristic associated therewith.

Therefore, in a frequency-controlled transmitting antenna, in relation to the longitudinal direction of the aircraft, a transmitting frequency is assigned to each azimuthal direction within the azimuthal region of ±15° mentioned. For the electronically controlled azimuthal swivelling of the main direction of the transmitting directional pattern within this region a frequency-modulated transmitting signal is therefore required. Preferably, a linear modulation is used, e.g., linearly increasing or linearly decreasing, in the mentioned frequency range of 32 GHz to 37 GHz, which corresponds to the azimuthal (total swivelling) range comprising a total angle of 30°. For the range resolution $\delta R = c/(2 \cdot \Delta f)$, where c is the velocity of light, a frequency sweep $\Delta f$ is required which depends on the desired range resolution. For example, a frequency sweep of $\Delta f = 100$ MHz corresponds to a range resolution of $\delta R = 1.5$ m. The modulation period as well as the corresponding coherent integration time $t_{TOT}$ is dependent on the desired target illumination time, i.e., time on target. For example, $t_{TOT} = 275$ µs is chosen. This means that in the swivelling range an azimuthal increment corresponds to the integration time $t_{TOT}$, the increment being determined by the azimuthal angular resolution. It is advantageous to select all increments within the region to be of identical size. For a chronologically continuous (radar) overview of the geographic area to be monitored, e.g., landing runway or taxiway, it is furthermore advantageous to scan the azimuthal (total angle) region with a constant azimuthal angular velocity. To this corresponds a linearly changing, e.g., linearly increasing, transmitting frequency over the entire region. FIG. 1 shows such a time-dependent transmitting frequency characteristic. Here, the (total) frequency differential $\Delta F$ corresponds to the azimuthal (total angle) region of, e.g., 30°. This frequency differential $\Delta F$ is passed through within a period of, e.g., approximately 33 ms, which corresponds to the (scanning) repeat rate (here, e.g., 30 Hz). The azimuthal (total angle) region is thus divided into azimuthally adjacent (angle) increments. In the time domain, a very specific time interval with an integration time $t_{TOT}$ (time length) is associated with each increment.

The azimuthal scanning of the region and the coherent evaluation in the azimuthal (angle) increments, explained in the following in greater detail, is possible in various ways. For instance, scanning can always take place in one azimuthal direction. In this case, the transmitting frequency characteristic, when seen over several scanning periods, is sawtooth-shaped (increasing ramp, e.g., for a scan always from the left; decreasing ramp, e.g., for a scan always from the right). However, chronologically adjacent scanning is also possible in both directions. In this case, the transmitting frequency characteristic, when seen over several sampling periods, is triangular-shaped.

Advantageously, scanning different from this is also possible. For instance, an azimuthal increment, in which a target is recognized, can be scanned several times in chronological succession, e.g., three times. In this case, the target illumination time, i.e., time on target, increases so that the target, e.g., can be classified precisely. With such scanning, e.g., a stair-shaped transmitting frequency characteristic according to FIG. 4 emerges over the region to be scanned.

Portions of the transmitting signal reflected at a target are preferably received by a receiving antenna that is mechanically independent of the transmitting antenna. This receiving antenna is identical to the afore-described transmitting antenna in its configuration. These mechanically independent antennas make possible the electrical decoupling required for a FM-CW radar of, e.g., at least 40 dB between the transmitting signal and the receiving signal. It is advantageous to dispose the transmitting antenna and the receiving antenna in azimuthal direction angularly offset relative to one another by a small angular amount, e.g., 0.3°. This creates so-called squinting antennas. This achieves according to FIG. 2a that despite the antenna lobes (directional patterns) being wide, e.g., 0.4°, a substantially reduced angular resolution of, e.g., 0.25° is accomplished. With such an antenna arrangement tolerable signal losses occur, which, however, can be reduced, if desired, by using a receiving antenna consisting of a plurality of individual receiving antennas.

Figure 2A:
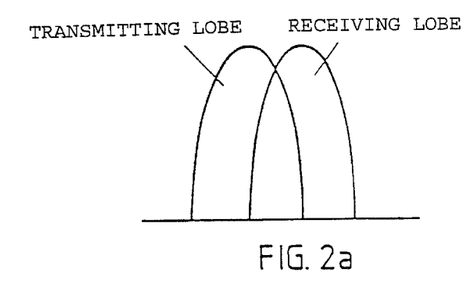
FIG. 2a is a diagram illustrating the directional relationship of transmission and receiving lobes for a single transmitting antenna and a single receiving antenna which are offset (squinting antennas)
Figure 2B:
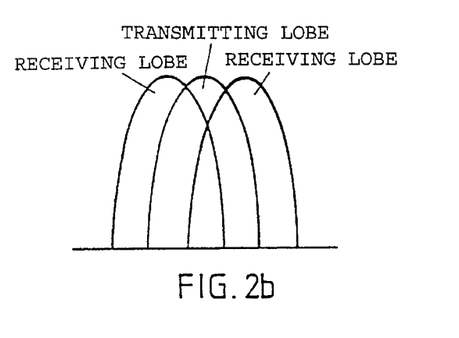
FIG. 2b shows the relationship corresponding to FIG. 2a for a single transmitting antenna and two individual receiving antennas.

FIG. 2b shows the relations corresponding to FIG. 2a for a transmitting antenna and two individual receiving antennas. For such (transmitting and/or receiving) antennas, e.g., slot antennas with straight waveguide feed can be used.

FIG. 1 illustrates the receiving frequency characteristic for such receiving antennas associated with the transmitting frequency characteristic illustrated there. A frequency shift occurs between the transmitting and receiving frequency characteristic, which is also called distance frequency. The associated time shift is designated with τ.

Figure 3:
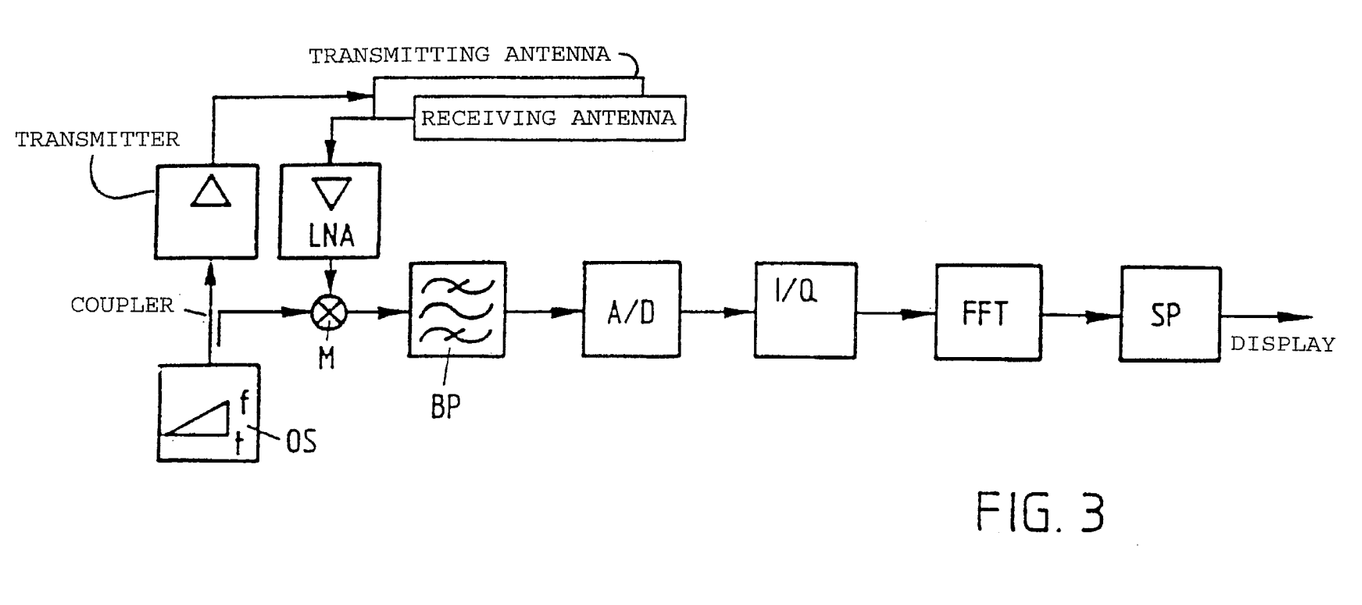
FIG. 3 is a block diagram of an exemplary FM-CW radar according to an embodiment of the invention.

FIG. 3 shows an exemplary block diagram of such a FM-CW radar. Here, in an oscillator OS, e.g., a frequency-modulated signal is produced that corresponds to the transmitting frequency characteristic according to FIG. 1. Via a coupler KO this signal reaches a transmitting amplifier (transmitter) where it is amplified and subsequently emitted by the transmitting antenna. The reflected signal portions are received by the receiving antenna, are amplified in a low-noise amplifier LNA (Low Noise Amplifier) and subsequently evaluated with the aid of a homodyne receiver. For this purpose, the amplified receiving signal is first mixed in a mixer M with the transmitting signal coupled out via the coupler KO into the so-called baseband and is fed via a band-pass filter BP (for the suppression of frequencies close to the transmitter and to avoid the so-called aliasing) to an analog/digital converter A/D. An analog video signal is thus applied at the converter input.

The A/D converter rate depends on the required range, range resolution and the target illumination time. The maximum frequency occurring $f_{max}$ follows from the formula $$f_{max} = \frac{R_{max}}{\delta R \cdot t_{TOT}}$$

Thus, e.g., given a maximum range $R_{max} = 6$ km, a range resolution of $\delta R = 3$ m and a $t_{TOT} = 275$ µs, the maximum frequency is $f_{max} = 7.3$ MHz. The sampling rate for the A/D conversion can then be selected at $f_s \geq 2 f_{max}$.

After the A/D converter follows a FFT (Fast Fourier Transformation) for the range resolution. With a resolution of 3 m and a range of 6 km, there are approx. 2,000 range gates, 2048 ($2^{11}$) are then selected. Since the input values are real, an I/Q processing must first be conducted (shift by $f_s/4$) in order to carry out a 2048 point FFT.

Following the FFT, the amounts of the range bins are produced in the signal processor (SP) and a distance correction ($R^{-4}$) and a velocity correction known per se (coupling of distance and velocity in FM-CW radar) are carried out.

The signal formed after the signal processor (SP) is evaluated, e.g., with the aid of a display (display screen) connected to it.

Because of the application of the FM-CW principle and the frequency-controlled scanning the method described has the following advantages, especially for an onboard radar:

Because of the use of a single frequency ramp as transmitting signal and the lack of a mechanical antenna control, the associated control electronics is simplified considerably.

The electrical losses with continuous beam swivelling are smaller than with a step-by-step swivelling.

The electronic beam swivelling accomplishes the high repeat rate of up to 30 Hz in spite of the required range and the wide scanning angle of ±15°.

The (transmitting) peak power is low (CW signal) so that, compared to a pulse radar, the hazards to persons in taxiing operations are negligible.

The frequency scanning principle causes at most a negligible mutual disturbance through interference of several 35 GHz radars in the same airport.

The technical reliability (MTBF) is very high mainly because of the consistent use of semiconductors and the lack of a mechanical scanning movement. Maintenance and logistics are therefore very simple and economical.

The concept is modular and can therefore be economically integrated into an existing weather radar system. When different platforms are used, the 35 GHz platform can be stabilized at low expenditure.

If the FM-CW radar is integrated into the weather radar (pulse device) the mutual interaction is minimal and thus not disturbing.

The system is fully coherent so that functional expansions in the signal processing area, e.g., Doppler processing for weather situation analyses are possible.

Range increase for the purpose of bad weather recognition can be accomplished economically through longer integration times and combination. An increase of the transmitting power is also unproblematic.

The described frequency sweep Δf results in a shift of the main direction of the directional pattern in an azimuthal increment per se. This results in a reduced lateral resolution per se. For actual applications this disadvantage can be avoided by selecting a correspondingly higher center transmitting frequency, e.g., the 45 GHz band instead of the described 35 GHz band.

Figure 4:
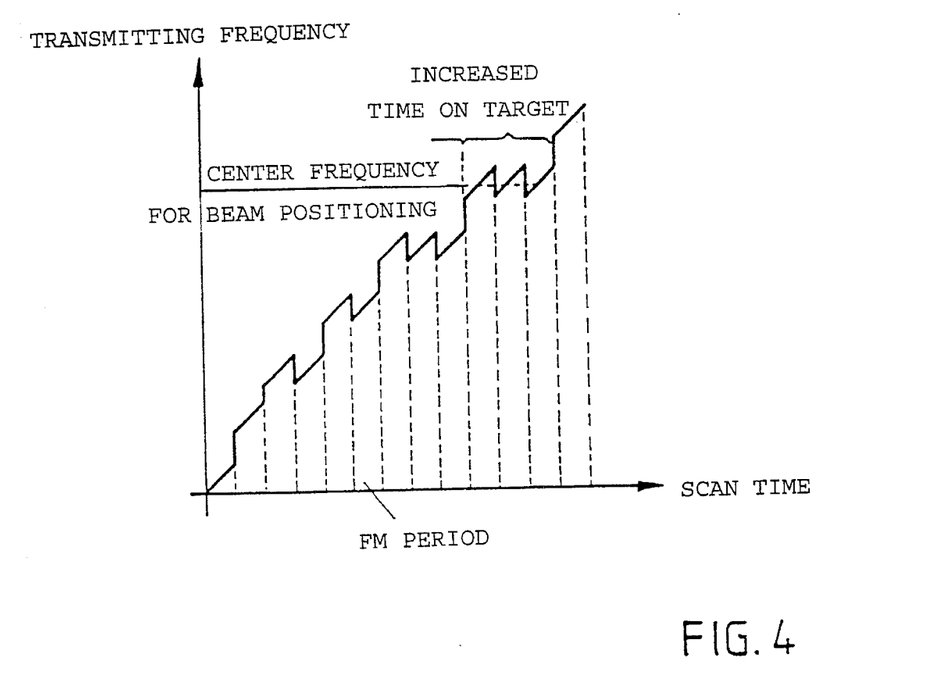
FIG. 4 shows a stair-shaped transmitting frequency characteristic for a step-by-step electronic beam swivelling.
Figure 5:
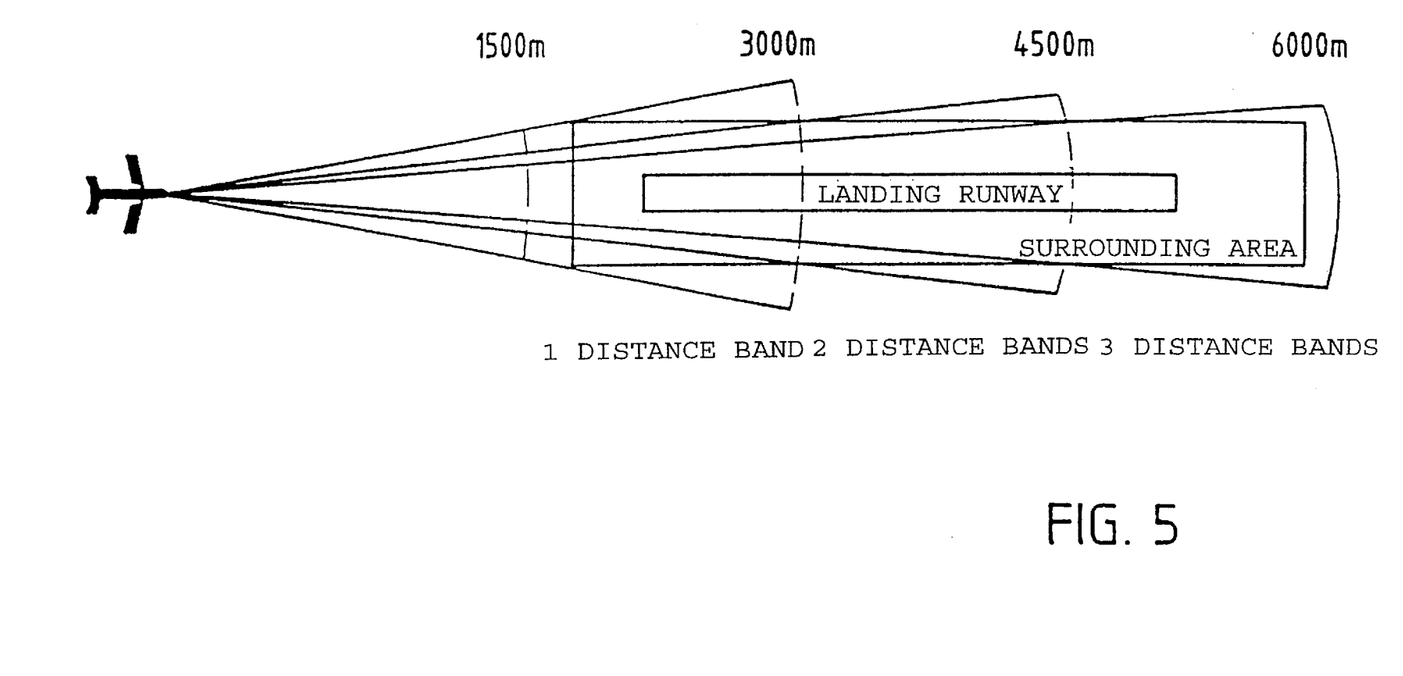
FIG. 5 illustrates switch-over to different distance bands effected during the landing approach of an aircraft.

On the basis of FIG. 4 it has already been mentioned that a step-by-step electronic beam swivelling is also possible in an advantageous manner. With such a method, e.g., the scanning conditions can be adjusted in a highly flexible manner to the changing ambient parameters. For instance, according to FIG. 5, a switch-over to different distance bands, which correspond to different (transmitting) frequency bands, can be effected during the landing approach of an aircraft so that an aircraft pilot always has optimum electronic vision that matches the flight condition. With such a frequency change according to FIG. 4 also disturbing atmospheric effects that cannot otherwise be recognized, e.g., disturbing downwashes microburst, in the area of the landing runway and/or atmospheric turbulences in the presence of otherwise low-cloud skies and good visibility, can be recognized and displayed so that an aircraft pilot can initiate corresponding countermeasures, e.g., a so-called go-around, in due time.

Figure 6:
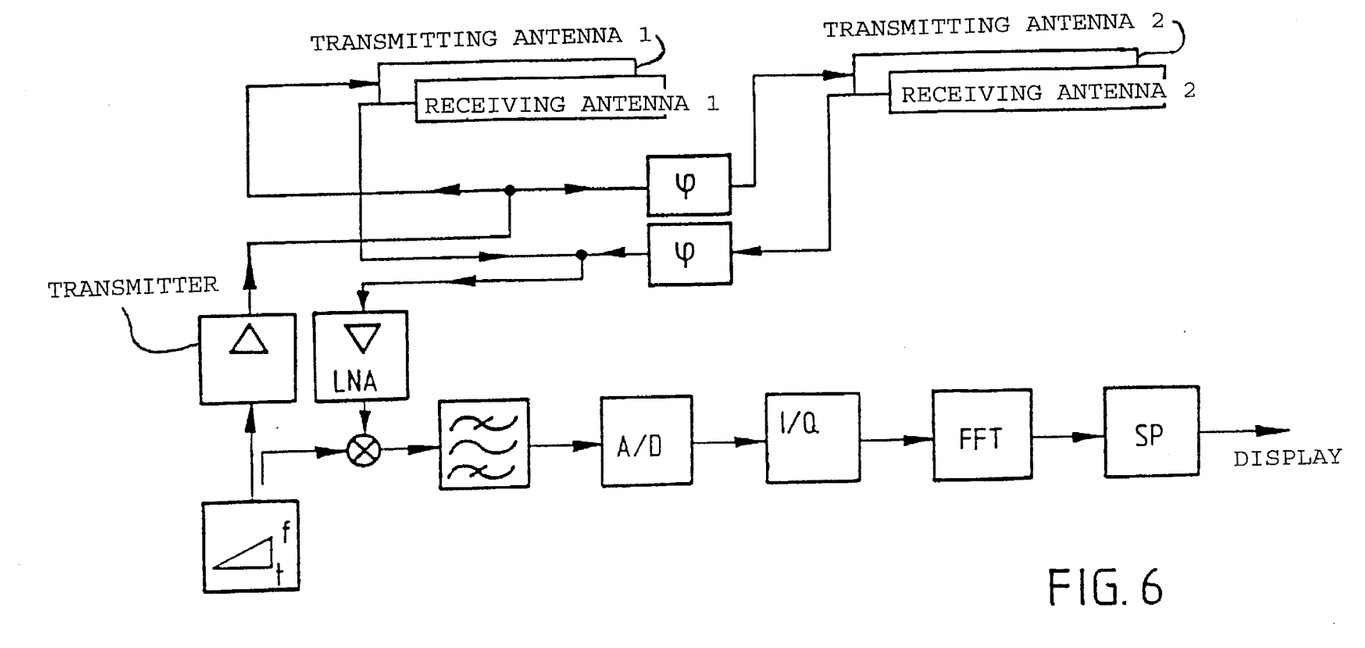
FIG. 6 is a block diagram of an arrangement according to an exemplary embodiment of the invention.
Figure 7:
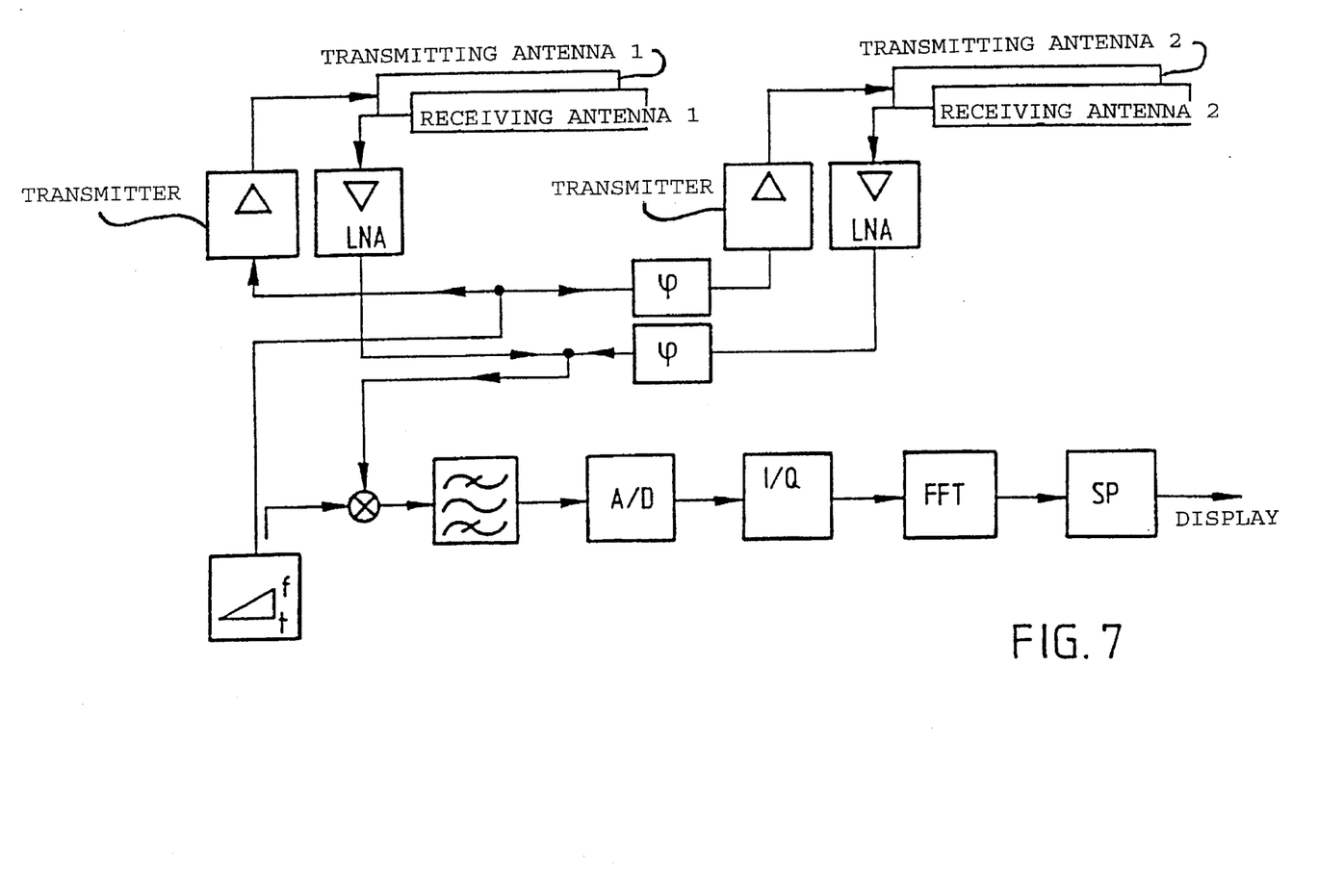
FIG. 7 is a block diagram of an arrangement according to another exemplary embodiment of the invention.

A disturbing shift of the main directions of the directional patterns existing within an azimuthal increment can be avoided if, within the increment, during the beam swivelling necessitated by the frequency change an additional phase change is carried out, e.g., with the aid of a so-called phased-array antenna arrangement. In such an arrangement, e.g., according to FIG. 6, a plurality of transmitting antennas (two units in FIG. 6) and a plurality of receiving antennas (two units in FIG. 6) are used instead of the one transmitting antenna and the one receiving antenna illustrated in FIG. 3. With the aid of the phase control elements ψ disposed between the transmitting and receiving antennas, the phase relations that are known per se, which are required for the additional phased-array operation, are adjustable. It is useful to arrange these phase control elements ψ according to FIG. 7 upstream of the transmitting amplifiers (transmitters) associated with the transmitting antennas or downstream of the receiving amplifiers LNA associated with the receiving antennas.

Furthermore, it is possible to set the phase shifters (phase control elements) to be dependent on the frequency of the oscillator.

The bidirectional scanning with the aid of a triangular-shaped modulation, which was already mentioned, also has the advantage that the Doppler shift can be determined based on the air speed.

The invention is not limited to the described embodiments but applicable analogically to further embodiments. For instance, for the transmitting and/or receiving antenna a so-called planar array antenna (resonance flatplate antenna) or a parabolic reflector antenna, e.g., of Cassegrain design, can be used. With such antennas a mechanical beam swivelling is useful.

Furthermore it is possible to use a single antenna as transmitting and/or receiving antenna.

The method described is not limited to application in aircraft but is also suitable as onboard radar for other means of transport, e.g., ships, e.g., for precise navigation and/or recognition of obstacles in the port area and/or within a river and/or channel.

We claim:

1. Method of monitoring an area with the aid of a frequency-modulated continuous-wave radar comprising:

emitting a frequency-modulated continuous-wave transmitting signal with at least one transmitting antenna having a directional pattern whose main azimuthal direction depends on the frequency of the transmitting signal, wherein:

related to a predeterminable direction, an azimuthal region is selected, in the selected region, an azimuthal swivelling of the directional pattern of the transmitting antenna is carried out by changing the frequency of the transmitting signal, in the selected region, each azimuthal value is assigned a frequency value of the transmitting signal, the selected region is divided into a predeterminable number of azimuthal increments adjoining one another, in each of said increments, a monotonous change of the frequency of the transmitting signal occurs;

receiving a reflected portion of the transmitting signal, which is reflected by the area to be monitored, with a receiving antenna, and performing a coherent signal processing for evaluating the receiving signal for each increment.

2. The method according to claim 1, wherein in each increment, a time-dependent linear change of the frequency of the transmitting signal occurs.

3. Method according to claim 1, wherein all increments are identical and have a predeterminable identical time length assigned to them.

4. The method according to claim 1, wherein the frequency of the transmitting signal and the time length of the increments are selected in dependency of the range and at least one of the radial and azimuthal resolution of the radar.

5. The method according to claim 1, wherein at least the transmitting antenna and the receiving antenna are components of an onboard radar for an aircraft.

6. The method according to claim 1, wherein the method is used in an aircraft as a landing aid and for taxiway monitoring.

7. Method according to claim 1, wherein the moving direction of an aircraft is selected as the predeterminable direction, and wherein the azimuthal region is arranged essentially symmetrically in relation to the predeterminable direction.

8. The method according to claim 1, wherein in an increment, the change of direction of the directional pattern caused by the frequency modulation of the transmitting signal is corrected by phase-changing means of at least one of the transmitting and the receiving antennas.

9. The method according to claim 1, wherein the increments are processed so that a coherent signal evaluation overlapping in time over the increments is performed.

10. A frequency-modulated continuous-wave radar for carrying out the method according to claim 1, comprising radar transmitter means, a transmitting antenna, and a receiving antenna, wherein the transmitting antenna and the receiving antenna have directional patterns whose main directions include a predeterminable angle for each transmitting frequency in azimuthal direction.

11. The radar according to claim 8, wherein at least the receiving antenna comprises at least two individual antennas with respective directional patterns whose main directions include predeterminable angles with respect to the main direction of the transmitting antenna for each transmitting frequency.

12. A frequency modulated continuous wave radar apparatus, comprising:

oscillator means for producing a frequency modulated radar signal;

transmitter means, including a transmission amplifier and a frequency controlled directional transmitting antenna, for amplifying and transmitting the frequency modulated radar signal;

coupling means for coupling the frequency modulated radar signal from the oscillator means to the transmitter means;

receiving means, including a frequency controlled directional receiving antenna and a low noise amplifier, for receiving and amplifying a reflected portion of the transmitted frequency modulated radar signal;

mixing means, connected to the coupling means for receiving the frequency modulated radar signal from the oscillator means, and connected to the low noise amplifier for receiving the amplified reflected portion of the transmitted frequency modulated radar signal, the mixing means mixing the frequency modulated radar signal and the amplified reflected portion of the transmitted frequency modulated radar signal therein and outputting a baseband signal;

filter means for anti-alias band-pass filtering the baseband signal and outputting a filtered signal;

analog-to-digital converting means for receiving and sampling the filtered signal and producing a corresponding digital output signal;

range resolution means, including fast Fourier transform means, for receiving and resolving radar range information from the digital output signal, and outputting a resolved signal;

signal processing means for receiving and processing the resolved signal, including performing distance and velocity corrections, and outputting a processed signal; and display means for displaying the processed signal to an operator of the radar;

wherein the frequency modulated radar signal produced by the oscillator means comprises a linear modulated signal which is swept through a predetermined frequency range.

13. The frequency modulated continuous wave radar apparatus of claim 2, wherein the frequency controlled directional transmitting antenna and the frequency controlled directional receiving antenna comprises a phased-array antenna arrangement having a plurality of transmitting antennas and a corresponding plurality of receiving antennas; and wherein the receiving means further comprises phase control means for adjusting phase relationships between antennas.

14. The frequency modulated continuous wave radar apparatus according to claim 13, wherein the phase control means is disposed at least one of:

between the oscillator means and the transmission amplifier; and between the low noise amplifier and the mixing means.

15. The frequency modulated continuous wave radar apparatus according to claim 12, wherein the range resolution means further includes I/Q processing means, disposed between the analog-to-digital converting means and the fast Fourier transform means, for shifting frequencies in the digital output signal prior to fast Fourier transformation by the fast Fourier transform means.

16. The frequency modulated continuous wave radar apparatus according to claim 12, wherein the linear modulated signal is swept through a predetermined frequency range with a saw-toothed modulation.

17. The frequency modulated continuous wave radar apparatus according to claim 12, wherein the linear modulated signal is swept through a predetermined frequency range with triangle-shaped modulation.

18. The frequency modulated continuous wave radar apparatus according to claim 12, wherein the linear modulated signal is swept through a predetermined frequency range with a stair-shaped modulation.

19. The frequency modulated continuous wave radar apparatus according to claim 13, wherein the antennas are identical, the transmitting and receiving antennas are offset in an azimuth direction by an angle of approximately 0.3°, each antenna has a length of approximately 1.2 m and a height of approximately 0.15 m, antenna gain is approximately 42 dB, the frequency range is between 32 GHz and 37 GHz, and the frequency range is swept at a rate of approximately 30 Hz.

* * * * *